United States Patent
Chang et al.

(10) Patent No.: US 8,790,850 B2
(45) Date of Patent: Jul. 29, 2014

(54) CURRENT COLLECTION APPARATUS AND METHOD OF PROCESSING FOR A SOLID OXIDE FUEL CELL THEREOF

(75) Inventors: Jen-Chen Chang, Taoyuan County (TW); Maw-Chwain Lee, Taoyuan County (TW); Rung-Je Yang, Taoyuan County (TW); Tai-Nan Lin, Taoyuan County (TW); Yang-Chuang Chang, Taoyuan County (TW); Wei-Xin Kao, Taoyuan County (TW); Lin-Song Lee, Taoyuan County (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 49 days.

(21) Appl. No.: 13/410,285

(22) Filed: Mar. 1, 2012

(65) Prior Publication Data
US 2013/0230791 A1 Sep. 5, 2013

(51) Int. Cl.
*H01M 8/00* (2006.01)
*H01M 4/64* (2006.01)
*H01M 2/20* (2006.01)

(52) U.S. Cl.
USPC ............ 429/535; 429/507; 429/517; 156/277

(58) Field of Classification Search
USPC ......... 429/400–435, 507–509, 517–522, 535; 156/277
See application file for complete search history.

(56) References Cited

U.S. PATENT DOCUMENTS

| | | | |
|---|---|---|---|
| 2002/0117762 A1* | 8/2002 | Ikegami | 257/782 |
| 2008/0311434 A1* | 12/2008 | Rey-Mermet et al. | 429/12 |
| 2010/0015503 A1* | 1/2010 | Yaguchi et al. | 429/34 |
| 2012/0012178 A1* | 1/2012 | Chuang et al. | 136/256 |
| 2012/0034541 A1* | 2/2012 | Muraoka et al. | 429/456 |

* cited by examiner

*Primary Examiner* — Muhammad Siddiquee

(57) ABSTRACT

A current collection apparatus and its method of processing for a solid oxide fuel cell, which mainly includes using screen printing process to print conductive adhesive onto the surface of the electrode of solid oxide fuel cell (SOFC), forming a current collection layer with drying process, using an appropriate amount of conductive adhesive to paste a conductive wire onto the current collection layer, forming an adhesion layer through drying, fixing the conductive wire on the electrode surface with an appropriate amount of ceramic adhesive, and forming a fixing layer after baking. A good connection is hence made between metal conductive wire and electrode through current collection layer, not only the interface impedance between electrode and current collection layer can be reduced effectively, but also the output power density of the SOFC unit cell can be enhanced, and stable as well as long term power output can be provided.

7 Claims, 7 Drawing Sheets

CURRENT COLLECTION APPARATUS AND METHOD OF PROCESSING FOR A SOLID OXIDE FUEL CELL THEREOF

BACKGROUND OF THE INVENTION

1. Field of the Invention

This invention relates to a current collection apparatus and its method of processing for a solid oxide fuel cell, it specifically relates to a current collection apparatus and its processing method so that a direct connection can be made with the electrode to reduce the entire interface impedance and to enhance the electrical conductivity efficiency.

2. Description of the Prior Art

Today, the petroleum storage on earth is reduced gradually, along with the gradual attention of environmental protection and green house effect gas $CO_2$ topic, the development of more environmental protection energy storage and energy conversion technique thus becomes so important. Solid oxide fuel cell (SOFC) has high performance energy conversion efficiency, it is of no noise, of low environmental pollution, of high reliability, meanwhile, the fuel is diversified and the power can be generated continuously and stably, hence, it is a power generation apparatus that has the greatest potential.

Since all the components of a general solid oxide fuel cell are solids, hence, the cell design is diversified, currently, the commonly used design can be divided into tubular type and planar type, among them, the planar structure has lower manufacturing cost, simple process and easier-to-develop thin film electrolyte, hence, planar structure is more widely studied. In recent years, in order to enhance the power density of the solid oxide fuel cell, the goal is usually put on the reduction of the polarization loss and ohmic loss of the cell. Polarization loss is usually surmounted through new material development and the improvement of electrode structure, for example, due to the insufficient high temperature ionic electrical conductivity, LSM cathode is gradually replaced by LSCF, meanwhile, pore former is added in the electrode to enhance the diffusion rate of gas in the electrode; moreover, the reduction of the entire ohmic loss is improved through the improvement of thin film technology so as to reduce the electrolyte thickness. However, generally, the entire ohmic loss not only is related to the electrolyte thickness, but also is highly related to the contact resistance between electrode and current collection apparatus, and contact resistance is always seen as the key factor affecting the power density of the cell.

As shown in FIG. 1, it is the structure of typical and traditional current collection apparatus, and it has a current collection apparatus 6 that is in direct contact with the surface of the electrode 4 of the solid oxide fuel cell. In the actual application, in order to reduce the contact resistance between the current collection apparatus 6 and electrode 4, the cell piece, the most commonly seen method is to increase directly the contact pressure between current collection apparatus 6 and electrode 4 so that close contact can be formed between both of them, and contact resistance can then be effectively reduced, however, too much pressure might usually lead to the difficulty in cell piece to take the external pressure and the final breakage, hence, the entire cell stack must be replaced due to the damage of only few cell pieces.

Due to the above drawbacks of the prior art current collection apparatus and processing method of solid oxide fuel cell, the inventor has thus provided much of improvements as described in this invention.

SUMMARY OF THE INVENTION

The main objective of this invention is to provide a current collection apparatus for solid oxide fuel cell, which uses screen printing to form a current collection layer on the electrode, moreover, the contact interface between the current collection layer and electrode is firmly adhesive via interface sintering, and it has relatively low contact resistance as compared to that of the traditional metal net current collector which has contact area of physical contact, hence, it can enhance effectively the current conduction efficiency.

Another objective of this invention is to provide a current collection apparatus and its method of processing for a solid oxide fuel cell, which uses screen printing method to prepare a current collection layer, and accompanied with the connection layer of conductive adhesive and the fixed wire of the fixing layer with ceramic adhesive, in addition to reducing the contact resistance between the electrode and current collector effectively, external force is totally avoided to be used for the reduction of contact resistance, and the chance of the damage of the cell piece is then reduced, finally, the manufacturing cost can be reduced.

To achieve the above objective and function in this invention, the technical methods adopted include: a current collection apparatus for a solid oxide fuel cell, which includes: a current collection layer, which is a conductive adhesive formed onto the electrode surface of solid oxide fuel cell; a conductive adhesive, which is conductive adhesive formed onto the current collection layer, and a metal conductive wire can then be pasted; a fixing layer, which is ceramic adhesive formed among the metal wire, conductive adhesive and current collection layer so as to fix the metal wires.

According to the above structure, the current collection layer covers roughly about 1~50% the electrode area.

According to the above structure, the current collection layer has longitudinal and transverse interleaved net grid arrangement structure.

According to the above structure, the mesh size of the grid can be 150~300 mesh.

According to the above structure, the line width of the grid can be 0.1 mm~5 mm.

According to the above structure, the conductive adhesive covers each of the pasting area between metal conductive wire and current collection layer.

This invention further includes: A method of processing of a current collection apparatus of a solid oxide fuel cell, and includes: a step "to screen-print the conductive adhesive of designed shape onto the electrode surface"; a step "to dry and sinter the conductive adhesive so as to form current collection layer" onto the electrode, and the current collection layer has transversely and longitudinally interleaved grid structure; a step "to use conductive adhesive to form a conductive adhesive so as to paste a metal conductive wire above current collection layer", and the conductive adhesive covers each of the pasting area between metal conductive wire and current collection layer; a step "to dry and sinter the conductive adhesive"; a step "to use ceramic adhesive to form a fixing layer to paste and fix the metal conductive wire onto the electrode"; a step "to dry and sinter the fixing layer".

According to the above method, the conductive adhesive screen-printed onto the electrode surface is dried through 60-200° C. baking for one hour. According to the above method, after the drying of the conductive adhesive screen-printed onto the electrode surface, it is then baked for another hour at 500-1000° C. so that conductive adhesive can be sintered into current collection layer.

According to the above method, the conductive adhesive is baked at 60-200° C. for one hour for drying.

According to the above method, after the drying of the conductive adhesive, it is then baked for one more hour at 500-1000° C. so as to sinter the conductive adhesive.

According to the above method, the fixing layer is placed for 16 hours at room temperature so that the ceramic adhesive can form the bonding mildly.

According to the above method, the fixing layer is baked at 60-100° C.

According to the above method, the dried fixing layer is baked for one hour at 150~200° C. so that the ceramic adhesive can sinter.

For the detailed structure, application principle, function and effectiveness of this invention, you can refer to the descriptions accompanying the attached drawings to get the full understanding:

DETAILED DESCRIPTION OF THE INVENTION

Figure 3A:
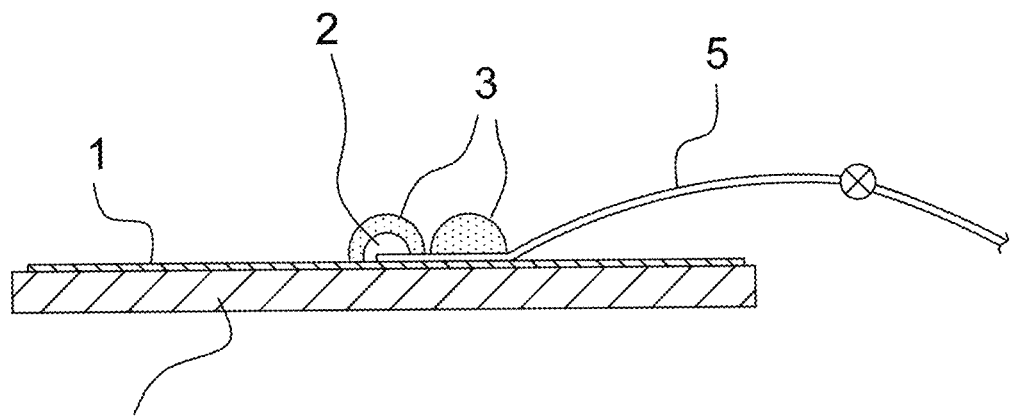
FIG. 3A is the cross sectional structure drawing of current collection apparatus of this invention.
Figure 3B:
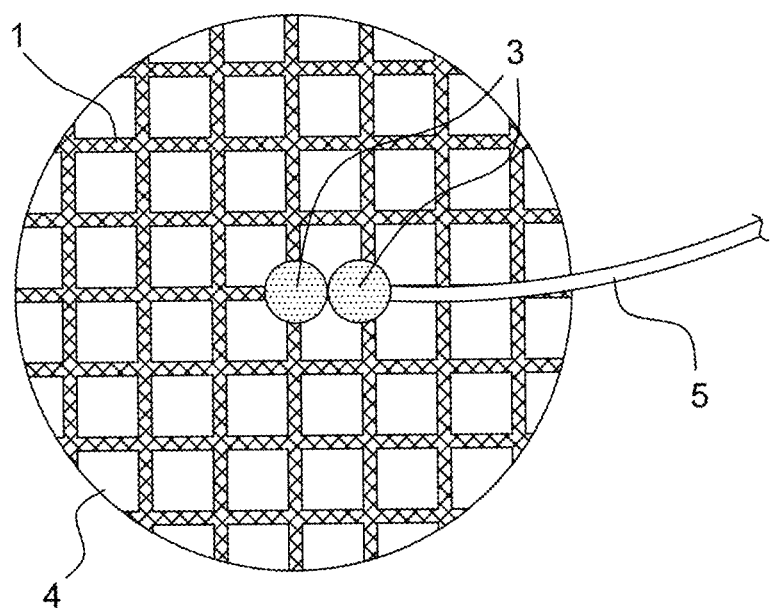
FIG. 3B is the top view planar structure drawing of current collection apparatus of this invention.
Figure 4:
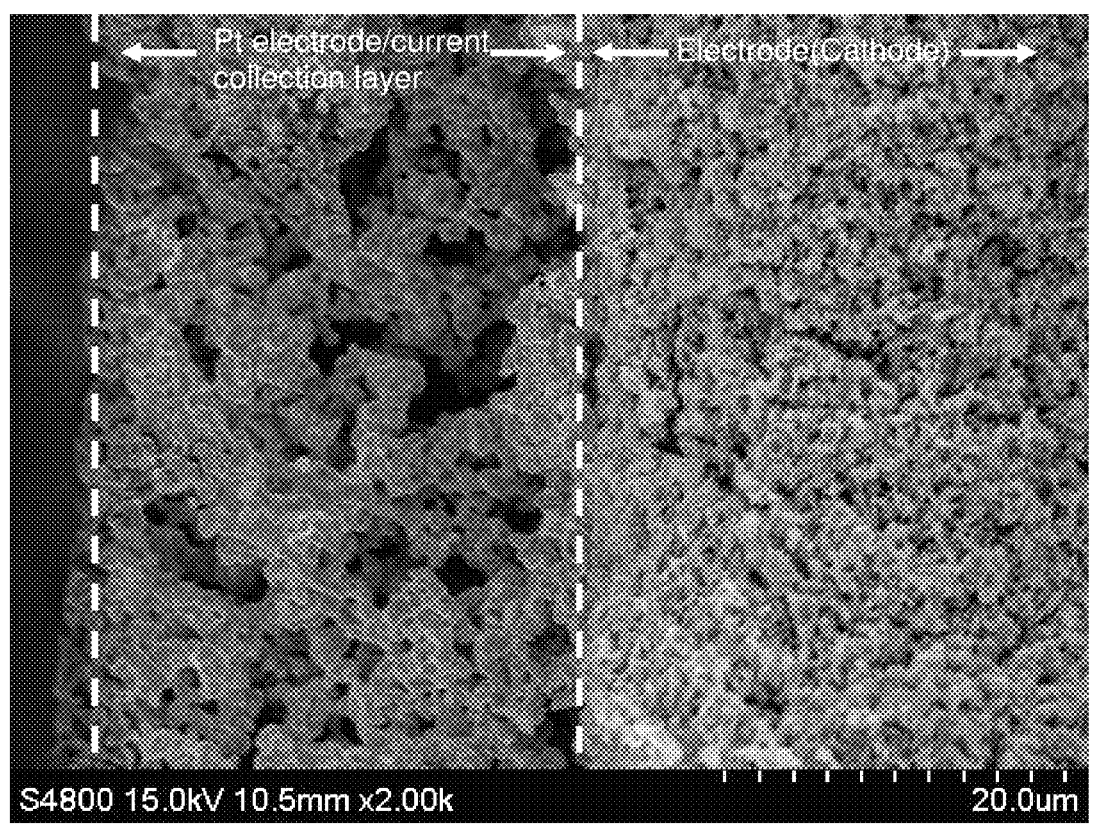
FIG. 4 is the SEM cross section structure drawing of current collection layer of this invention.

Please refer to FIG. 2, 3A, 3B and 4, and it is clear that the entire processing flows of this invention mainly include: a S11 step "to screen-print the designed shape conductive adhesive onto the electrode surface", a S12 step "to dry and sinter the conductive adhesive so as to form current collection layer onto the electrode", a S13 step "to use conductive adhesive to form a conductive adhesive so as to paste a metal conductive wire above a current collection layer", a S14 step "to dry and sinter the conductive adhesive", a S15 step "to use ceramic adhesive to form a fixing layer, then to paste and fix the metal conductive wire above the electrode", a S16 step "to dry and sinter the fixing layer"; wherein the S11 step "to screen-print designed shape conductive adhesive onto the electrode surface" is to use screen printing technology to screen-print the needed conductive adhesive pattern onto the surface of electrode 4 (cell piece) of solid oxide fuel cell, and the conductive adhesive pattern can be longitudinally and transversely interleaved grid arrange structure (as shown in FIG. 3B), wherein the mesh size of the grid can be 150~300 mesh, and the line width scope of the grid can be 0.1 mm~5 mm, through the S12 step "to dry and sinter the conductive adhesive so as to form current collection layer onto the electrode", use temperature of 80~200° C. to remove the solvent in the conductive adhesive, then use the temperature of 600~1000° C. to perform several hours of sintering of conductive adhesive so that the screen-printed conductive adhesive can form a current collection layer 1 (as shown in FIG. 3A) on electrode 4, meanwhile, the current collection layer 1 covers about 1~50% the area of electrode 4, after this stage is finished, based on your need, you can use SEM microstructure analysis (as shown in FIG. 4) to confirm good interface bonding of electrode/current collection layer; then through S13 step "to use conductive adhesive to form a conductive adhesive, then paste a metal conductive wire onto the current collection layer", then a metal conductive wire 5 is pasted to current collection layer 1, then conductive adhesive is used to paste the metal conductive wire 5 and current collection layer 1, then through S14 step "to dry and sinter the conductive adhesive", then temperature of 80~200° C. is used to remove the solvent within the conductive layer to paste the metal conductive wire 5 onto current collection layer 1, then temperature of 600~1000° C. is used to perform several hours of conductive adhesive sintering so as to form an adhesive layer 2; finally, the S15 step "to use ceramic adhesive to form a fixing layer, then to paste and fix the metal conductive wire onto the electrode" is implemented, then step S16 "to dry and sinter the fixing layer" is implemented, that is, ceramic adhesive is used to paste the metal conductive wire 5 onto electrode 4, meanwhile, it is placed at room temperature for 16~20 hours so that ceramic adhesive can form the bonding mildly, then it is baked at temperature of 90° C. so as to remove the extra water in the ceramic adhesive, in addition, in the temperature range of 150~200° C., the ceramic adhesive is baked so as to enhance the strength of the ceramic adhesive and to form a fixing layer 3.

Please refer to FIG. 3A to 7, and in the following, we only use an embodiment to explain the above processing method:

1. The adopted cell unit can be planar solid oxide fuel cell unit formed by NiO—YSZ//YSZ//LSM, and the support layer is round piece of diameter of three centimeters formed by tape casting process with entire thickness of 600~1000 μm.
2. Use spray gun or polished method to clean the surface of the electrode 4 (cell piece) of the cell unit, then screen printing technology is used to screen-pint the pattern of conductive adhesive (which can be Pt paste) to the surface of the electrode 4 of the cell unit, and the conductive adhesive pattern has longitudinally and transversely interleaved grid arrangement structure, and the mesh size of the grid can be 250 mesh, and the line width scope of the grid can be 1 mm.
3. Put the screen-printed electrode 4 (cell piece) into the oven, then use 80° C. to dry for one hour, then use temperature of 900° C. to bake the electrode 4 (cell piece) for one hour so that conductive adhesive (Pt paste) will be sintered into a current collection layer 1.
4. Then, based on the need, SEM can be used to analyze the microstructure of the interface pasting between electrode and current collection layer, then whether the interface between electrode and current collection layer is good or not is confirmed, and whether the pasting of the interface between current collection layer 1 and the interface of LSM electrode 4 is also confirmed.
5. Paste a (platinum) metal conductive wire 5 onto the current collection layer 1, then cover the conductive adhesive (Pt adhesive) on each of the pasting area between metal conductive wire 5 and current collection layer 1; then 80° C. is used again to dry for one hour, and 900° C. is used additionally to bake for one hour so that conductive adhesive (Pt paste) will be sintered to form a conductive adhesive 2.

6. Then the ceramic adhesive ($Al_2O_3$) is used to fix the metal conductive wire 5 onto electrode 4, next, electrode 4 is placed at room temperature for 16 hours so that mild bonding can be formed in ceramic adhesive, then temperature of 90° C. is used to bake and to remove water, then 150~200° C. is used to bake for one hour to enhance the strength of the ceramic adhesive and to form a fixing layer 3.

Figure 1:
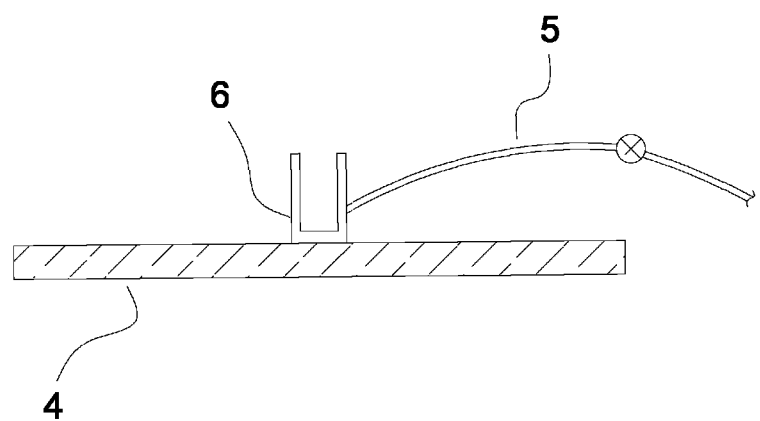
FIG. 1 is side view cross sectional structure drawing of a conventional current collection apparatus.
Figure 2:
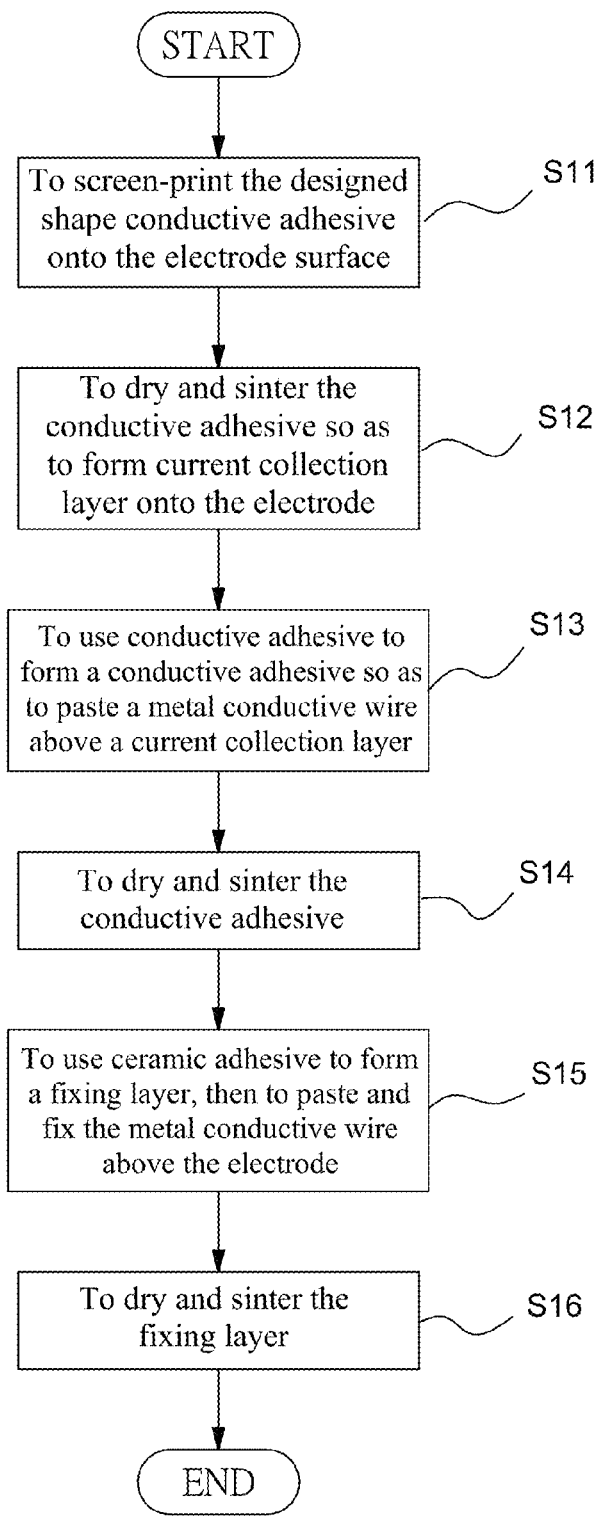
FIG. 2 is the entire processing flow chart of this invention.
Figure 5A:
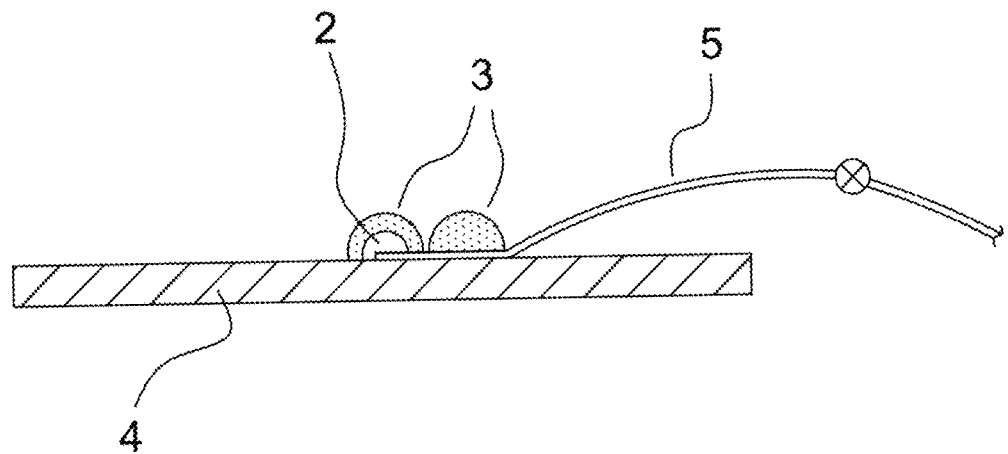
FIG. 5A is the side view cross sectional structural drawing of experimental reference apparatus that has the metal conductive wire fixed merely by ceramic adhesive.
Figure 5B:
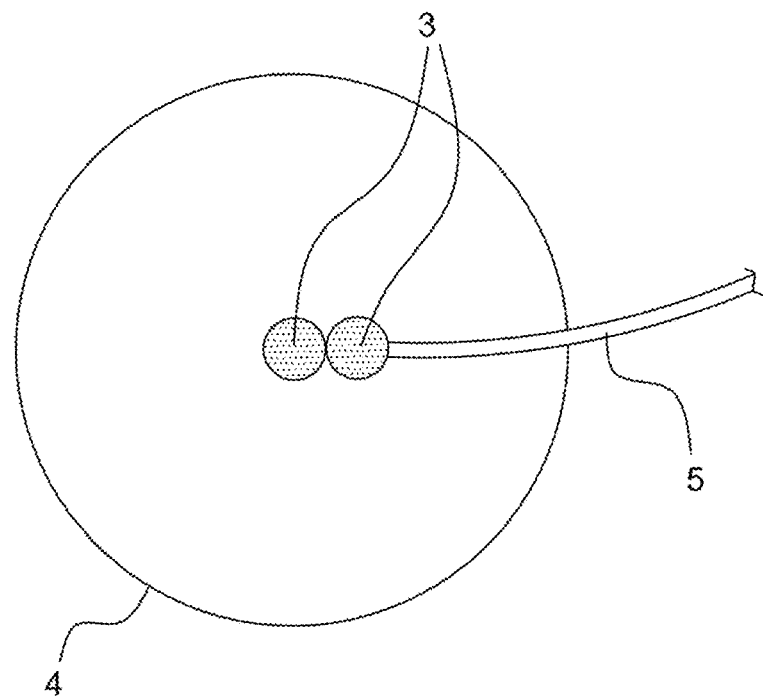
FIG. 5B is the top view planar structure drawing of the current collection apparatus of FIG. 5A.
Figure 6A:
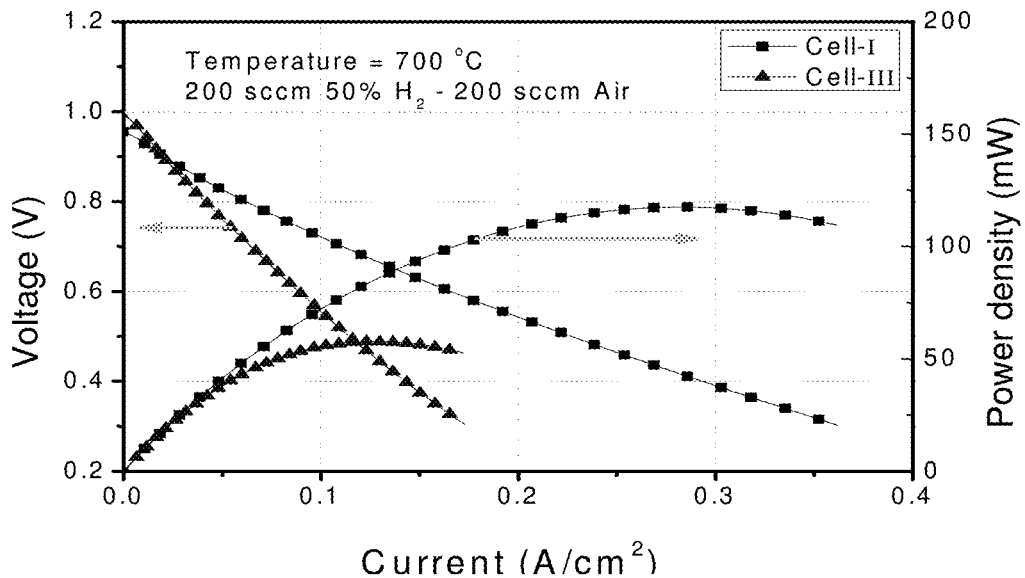
FIG. 6A is the current power density comparison chart between this invention and each experiment reference apparatus at 700° C.
Figure 6B:
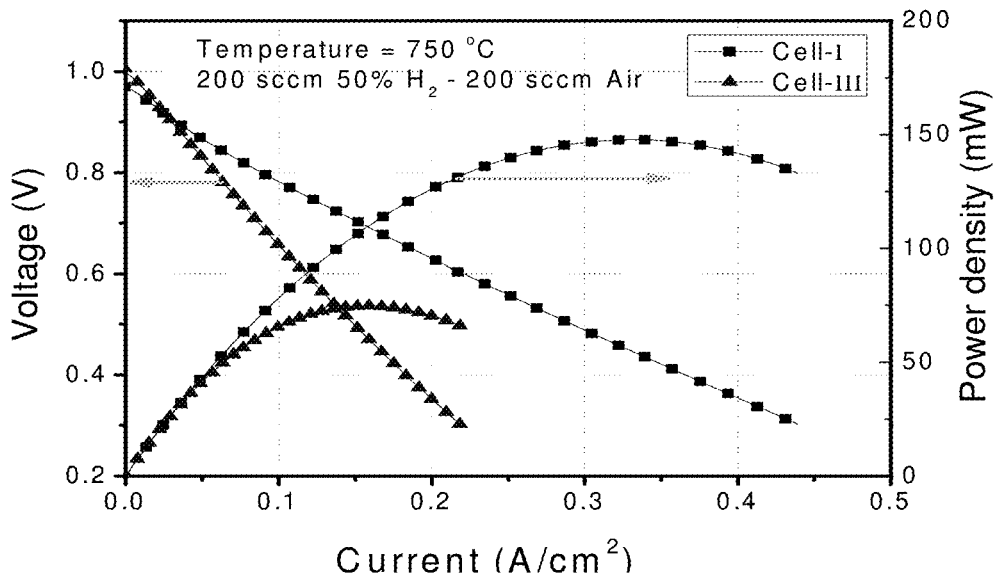
FIG. 6B is the current power density comparison chart between this invention and each experiment reference apparatus at 750° C.
Figure 6C:
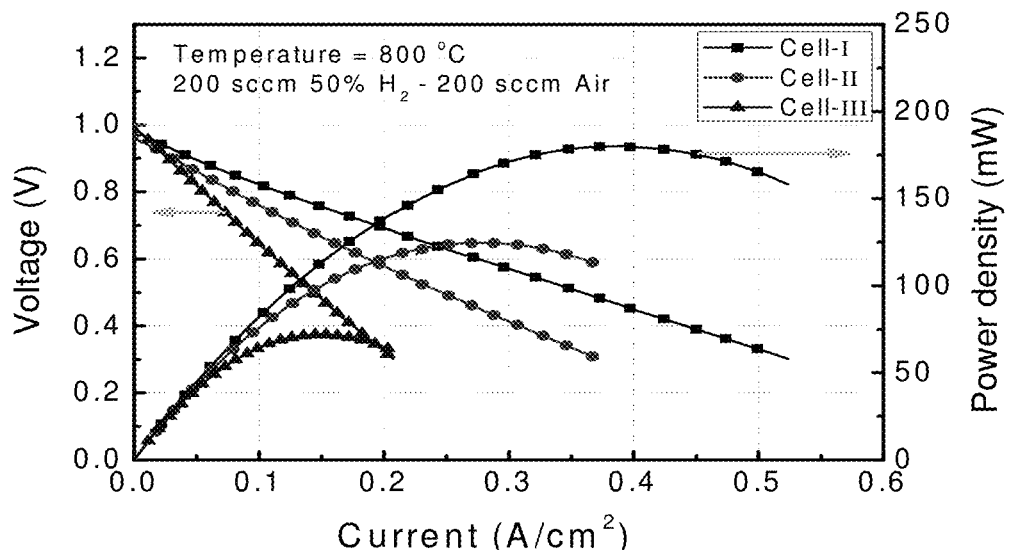
FIG. 6C is the current power density comparison chart between this invention and each experiment reference apparatus at 800° C.
Figure 7:
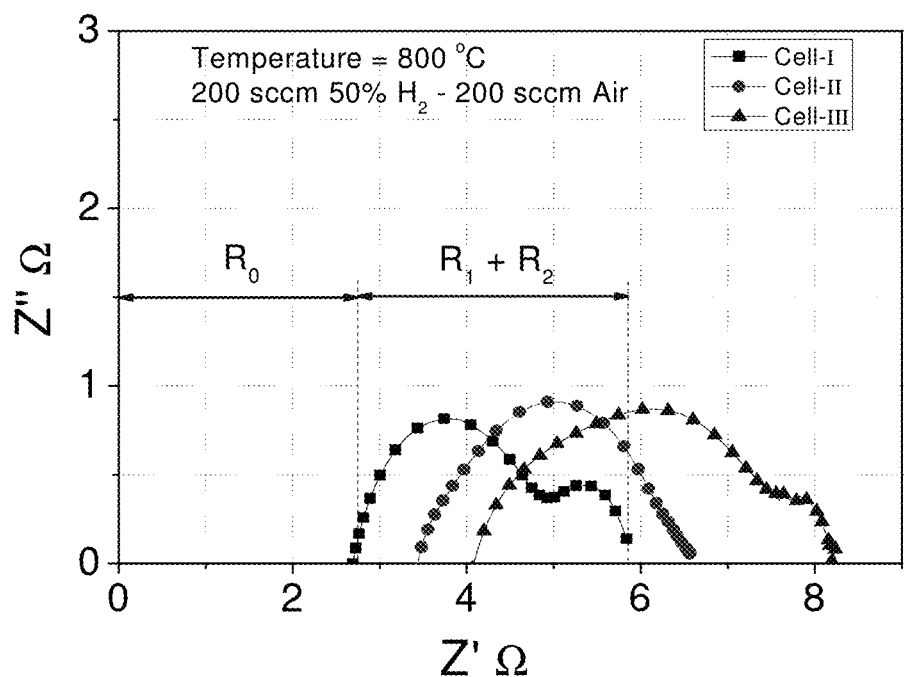
FIG. 7 is the AC impedance analysis comparison chart between this invention and each experiment reference apparatus.

In order to facilitate the comparison of the real product embodied through the above embodiment of this invention to other related or traditional similar structure to see if this invention has better electrical test results, here an experiment reference structure is designed (as shown in FIG. 5A, 5B), and here only conductive adhesive 2 is used to paste a metal conductive wire 5 onto electrode 4, meanwhile, fixing layer 3 (ceramic adhesive) is used to fix the current collection apparatus of the metal conductive wire 5 (which does not have current collection layer 1 as shown in FIG. 3); then the cell structure of this experiment reference structure (labeled as CELL II), this invention structure (labeled as CELL I) and the traditional current collection apparatus as shown in FIG. 1 (labeled as CELL III) is placed respectively into the experiment apparatus, then the temperature is raised in the rate of 1° C./min to 800° C., the H2 and air are sent to the anode and cathode respectively, wait for the reduction of the anode, then test the electrical characteristic of each cell respectively; FIG. 6A, 6B, 6C shows respectively current power density data when the temperature is respectively 700° C., 750° C. and 800° C., and FIG. 7 is the AC impedance analysis data when the temperature is 800° C.

According to the above test result, it is obvious that the electrical test characteristic of this invention structure (CELL I) is obviously better than those of the experiment reference structure (CELL II) and traditional current collection apparatus (CELL III); hence, the above current collection apparatus of this invention can maintain good and continuous pasting and fixing between metal conductive wire 5/current collection layer 1 so as to effectively avoid the influence of the interface by the external force or the thermal stress; meanwhile, it can avoid the teasing-off of the metal conductive wire 5 during the packaging and testing process, it can also take long time high temperature test of the cell, it can effectively reduce the entire resistance of the cell, and it can also enhance the electron transfer flux in the electrode; in addition, after ceramic adhesive is passed through high temperature sintering, the microstructure is of high porosity, hence, for the area that is covered by the ceramic adhesive, the diffusion rate of the gas fuel in the electrode will not be affected.

Furthermore, the above structure of this invention, during the actual application, can be applicable to tubular type or planar type SOFC anode support cell (ASC-type), electrolyte support cell (ESC-type) or cathode support cell (CSC-type), or it can even be Metal support cell (MSC-type); and the metal for the conductive adhesive can be Ag, Cu, Au or noble metal of Pd, or even it can be the co-use of two or more metals, and the metal oxide in the ceramic adhesive might be $SiO_2$, $ZrO_2$ and $Al_2O_3$.

From the above statement, the current collection apparatus and processing method of solid oxide fuel cell of this invention indeed can form good, robust and direct connection with the electrode, and it can also reduce the interface impedance of the electrode output current, hence, it has industrial utility, creativity and progressiveness.

However, what stated above is only one of the better embodiments of this invention, and it is not used to limit the embodiment scope of this invention. That is, any equivalent change and modification made according to scope of this invention should be covered by what is claimed in this invention.

What is claimed is:

1. A method of processing of a current collection apparatus having reduced contact resistance between a metal conductive wire and a current collection layer for a solid oxide fuel cell, which includes at least following steps:
   step A: screen-printing a conductive adhesive onto an electrode surface;
   step B: drying and sintering the conductive adhesive of step A so as to form a current collection layer onto the electrode covering 1-50% of the electrode surface, and the current collection layer has longitudinally and transversely interleaved grid structure having a mesh size from 150 to 300mesh with line width in a range of 0.1 mm-5 mm;
   step C: using the conductive adhesive to paste a metal conductive wire onto the current collection layer at a first crossing point of the interleaved grid, wherein the conductive adhesive covers the pasting area between the metal conductive wire and the current collection layer;
   step D: drying and sintering the conductive adhesive of step C;
   step E: using a ceramic adhesive to form a fixing layer so as to paste and fix the metal conductive wire on the current collection layer formed by screen-printing on the electrode surface at the first and an adjacent second crossing points of the interleaved grid;
   wherein the fixing layer is placed at room temperature for 16 to 20 hours so as to make mild bonding on the ceramic adhesive;
   step F: drying and sintering the fixing layer.

2. The method of processing of a current collection apparatus for a solid oxide fuel cell of claim 1, wherein the conductive adhesive screen-printed onto the electrode surface in step B is to be dried through baking in a range from 60 to 200° C. for one hour.

3. The method of processing of a current collection apparatus for a solid oxide fuel cell of claim 2, wherein the conductive adhesive screen-printed onto the electrode in step B is dried first, then it is baked for one hour in a range from 500 to 1000° C. so as to sinter the conductive adhesive to form the current collection layer.

4. The method of processing of a current collection apparatus for a solid oxide fuel cell of claim 1, wherein the conductive adhesive in step C is baked for one hour in a range from 60 to 200° C. for drying purpose.

5. The method of processing of a current collection apparatus for a solid oxide fuel cell of claim 4, wherein the conductive adhesive in step C is dried first, and then baked for one hour in a range from 500 to 1000° C. so as to sinter the conductive adhesive.

6. The method of processing of a current collection apparatus for a solid oxide fuel cell of claim 1, wherein the fixing layer in step F is baked and dried in a range from 60 to 100° C.

7. The method of processing of a current collection apparatus for a solid oxide fuel cell of claim 6, wherein the fixing layer in step F after drying is baked in a range from 150 to 200° C. for one hour so as to sinter the ceramic adhesive.

* * * * *